June 7, 1966 R. D. CROSS 3,254,627
ANIMAL CAGE CONSTRUCTION
Filed May 22, 1964 5 Sheets-Sheet 1

REX D. CROSS
INVENTOR
BY
BUCKHORN, BLORE, KLARQUIST & SPARKMAN
ATTORNEYS

June 7, 1966  R. D. CROSS  3,254,627
ANIMAL CAGE CONSTRUCTION
Filed May 22, 1964  5 Sheets-Sheet 3
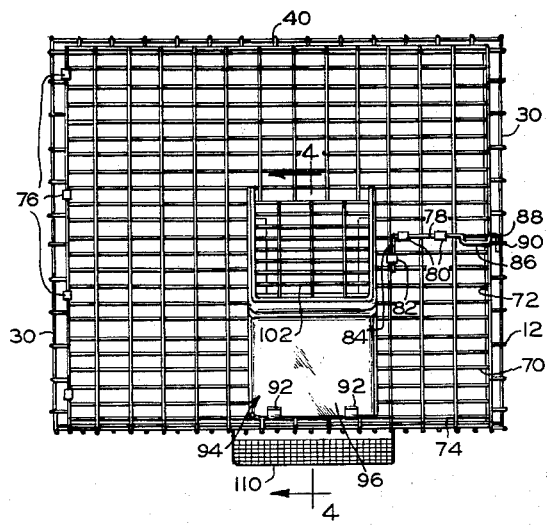
FIG. 3
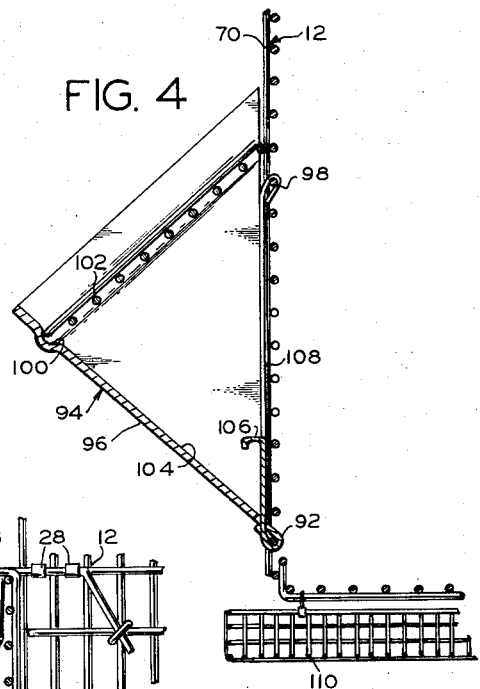
FIG. 4
FIG. 5
REX D. CROSS
INVENTOR
BY
BUCKHORN, BLORE, KLARQUIST & SPARKMAN
ATTORNEYS

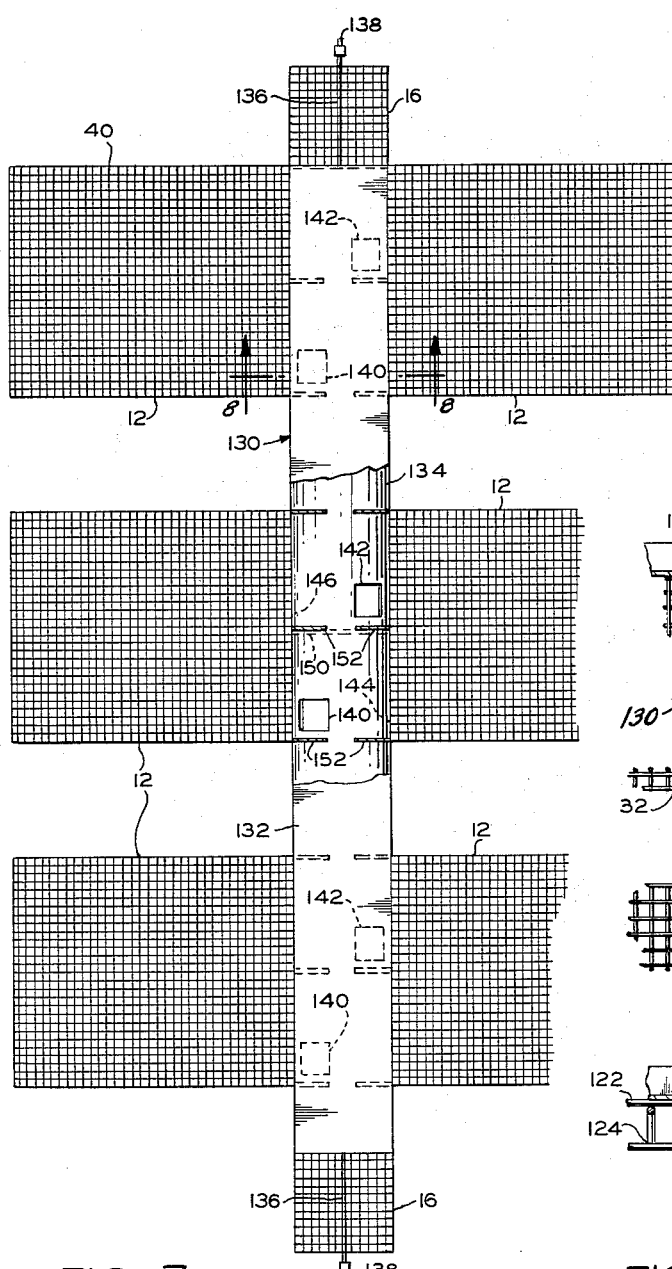
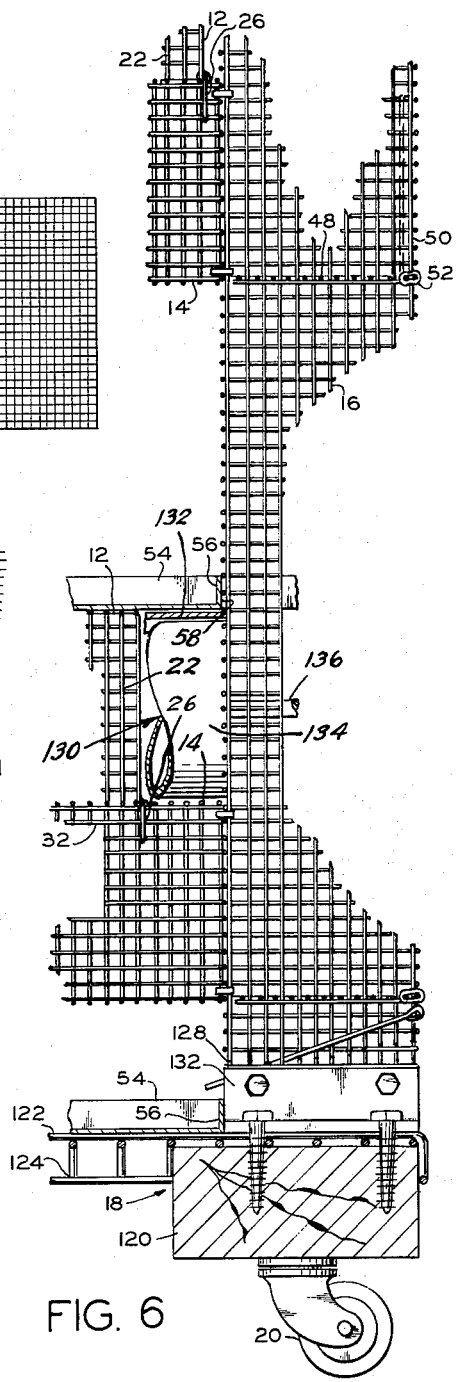
FIG. 7
FIG. 6

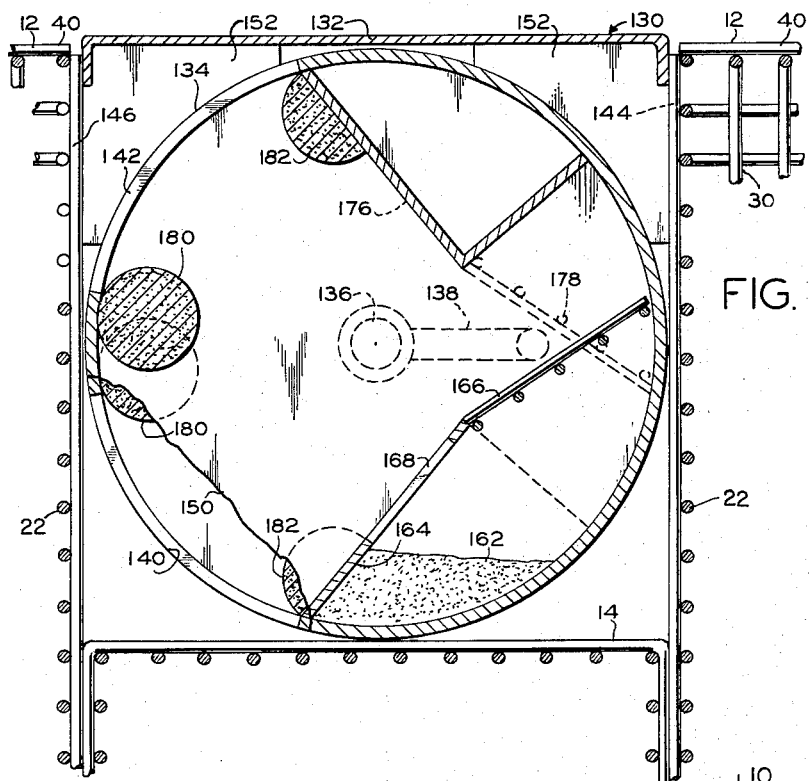

United States Patent Office 3,254,627
Patented June 7, 1966

3,254,627
ANIMAL CAGE CONSTRUCTION
Rex D. Cross, 18021 SE. Mill Court, Portland, Oreg.
Filed May 22, 1964, Ser. No. 369,372
8 Claims. (Cl. 119—17)

This invention relates to an animal cage construction, and more particularly to a module type, adjustable animal cage device.

In the keeping of animals such as, for example, chinchillas, rabbits and the like, it is desirable to have the cages spaced from each other but arranged in a small space. It is also desirable to have an enclosure or cage for a male chinchilla selectively accessible to a plurality of cages in which single female chinchillas are positioned, and to be able to selectively close off the male enclosure from the female enclosures during periods of the animals becoming accustomed to one another and during bearing of the young, and the like. Cage constructions known hitherto have not been satisfactory for these purposes. It would also be desirable to provide a simple, easily actuated dusting apparatus for selected access thereto from a large number of cages of individual animals. It would also be desirable to provide a watering system in which a large number of cages have tanks which can be quickly connected to and disconnected from a water supply.

An object of the invention is to provide a new and improved animal cage construction.

Another object of the invention is to provide a module type, animal cage device.

Another object of the invention is to provide a plurality of animal cages adjustable on a runway between positions in which doorways in the cages and the runway are in alignment, and closed positions in which the doorways in the cages and the runways are out of alignment with each other.

Yet another object of the invention is to provide a module type animal cage construction in which a plurality of cages may be selectively hung on a runway.

Still another object of the invention is to provide a dusting apparatus having compartments therein and movable selectively to positions opening doorways of different cages to the interior of the dusting device.

A still further object of the invention is to provide a watering system for a plurality of animal cages including a water main, a plurality of headers extending from the main and a plurality of branches extending from the headers and having valves therein which are opened by quickly operable couplings carried by troughs individual to the plurality of cages.

Another object of the invention is to provide new and improved feeding troughs for animal cages.

The invention provides an animal cage construction in which there preferably is provided a plurality of runways and a plurality of cages having hooks for suspending the cages from the runways selectively in positions in which doorways in the cages are open to doorways in the runways and positions in which the doorways in the cages are closed to the doorways in the runways. The runways may be positioned in parallel horizontal positions connected at the ends thereof to vertical runways having selectively operable gates therein to form a vertical framework to opposite sides of which rows of cages may be detachably secured. Cylindrical dusters may be mounted rotatably on the tops of the horizontally extending runways between the rows of the cages and tangent to the rows of the cages, with covers extending across the tops of the cylindrical dusters to the cages. The cylindrical dusters have partitions therealong dividing each duster into a plurality of dusting compartments with each dusting compartment having a doorway in the side of the cylinder, with the doorways being alternately offset from each other around the cylinder and along the cylinder and being adapted to be brought selectively into first positions in which half of the doorways are open to doorways in cages on one side of the cylinder and corresponding doorways in the cages on the other side of the cylinder are closed, a second position in which this condition is reversed, and a third position in which all the doorways in the cages on both sides of the cylinder are closed. There may be provided a watering system including an elevated reservoir for holding water under a few pounds pressure, together with a conduit system extending under the runways with branches extending out under the cages, and troughs carried by the cages with connectors which open valves in the branches when connected thereto to cause water to be supplied to the troughs. Each of the troughs has a valve housing therein having an upwardly facing port with a valve closure member in the housing and connected to a ball float in the trough which moves the closure member to a position closing the port when water reaches a predetermined level in the trough. An overflow system connects the troughs to a drain. Droppings pans may be positioned below each level of cages, and, except for the bottom pans, may be supported on the tops of the cages in positions directly below the cages thereabove.

A complete understanding of the invention may be obtained from the following detailed description of an animal cage construction forming a specific embodiment thereof, when read in conjunction with the appended drawings, in which:

FIG. 3 is a front elevation view of a cage of the cage construction of FIG. 1;

FIG. 4 is an enlarged, fragmentary vertical sectional view taken substantially along line 4—4 of FIG. 3;

FIG. 5 is an enlarged fragmentary vertical sectional view of a cage and a runway of the cage construction of FIG. 1 taken substantially along line 5—5 of FIG. 2;

FIG. 6 is an enlarged fragmentary vertical sectional view of a supporting platform and a portion of the cage construction of FIG. 1 taken substantially along line 6—6 of FIG. 1 and having portions thereof broken away;

FIG. 7 is a fragmentary top plan view of the cage construction of FIG. 1;

FIG. 8 is an enlarged fragmentary vertical sectional view of a duster and runway and cages of the cage construction of FIG. 1 taken substantially along line 8—8 of FIG. 7;

FIG. 9 is a schematic perspective view of a watering system of the cage construction of FIG. 1;

FIG. 10 is a fragmentary vertical sectional view of a watering trough of the cage construction of FIG. 1 taken substantially along line 10—10 of FIG. 9.

Figure 11:
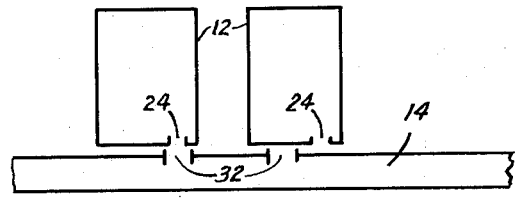
FIG. 11 is a diagrammatic, horizontal sectional view of a runway and cages of the animal cage construction of FIG. 1.

Referring now in detail to the drawings, a cage construction 10 forming one embodiment of the invention includes individual cages 12 mounted in pairs of horizontal rows positioned above one another on opposite sides of horizontal runways 14 fixed to and supported by a pair of vertical runways 16 to form a frame therewith which is supported by a platform 18 mounted on rollers 20 for moving the entire cage construction from place to place. Each cage 12 has a back wall 22 having a doorway 24 therein and has a pair of quick releasing U-shaped wire hooks 26 secured by clips or rings 28 to the mesh of side walls 30 and adapted to hook into the mesh of the sides of the runways to support the cage in cantilever fashion from the runway. The hooks 26 (FIG. 5) have angular shanks secured to horizontal and vertical wires of the cage to prevent turning of the hooks and fix the hooks rigidly to the cages.

Figure 1:
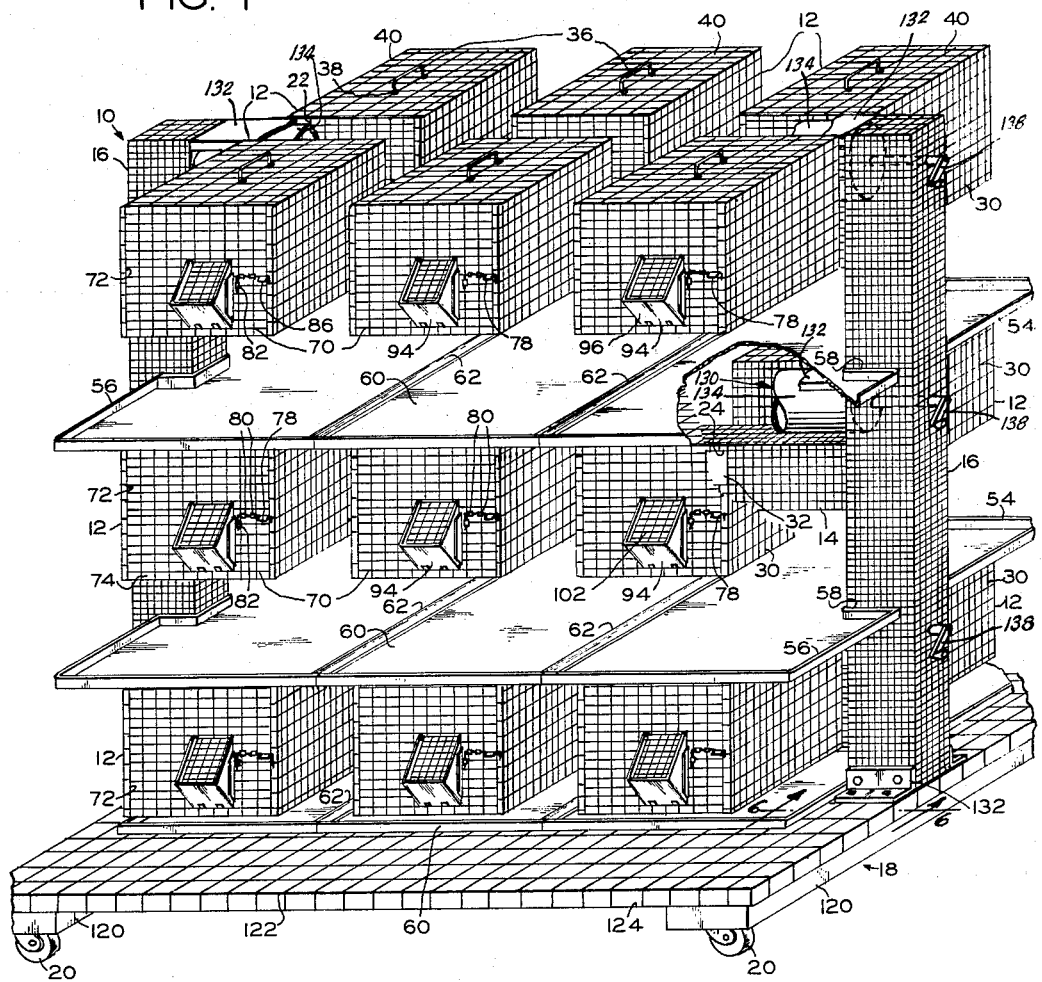
FIG. 1 is a perspective view of an animal cage construction forming one embodiment of the invention.

Each cage, when it is desired to provide access from that cage to its associated runway, is hooked on the runway in a position in which the doorway 24 is aligned with a doorway 32 in the runway, and a male animal in the runway may move into the cage 12 so positioned, while a female animal stationed in the cage 12 has a collar with projecting spokes too large to go through the doorways 24 and 32. Each cage 12 has a U-shaped handle 36 (FIG. 1) having eye portions 38 secured to open wire mesh top 40 of the cage for manipulation. When the male in the runway 14 and the female in a particular cage 12 are unfamiliar to each other, they are likely to engage in a lethal fight, and until they become familiar with each other it is essential that they be kept apart. However, it is desirable that the male and female be kept in close proximity to each other even when unfamiliar with each other so that they may become acquainted and accustomed to one another, and for this purpose the cage 12 is hung on the runway in which the doorways 24 and 32 are offset from each other and thus are closed, the hooks 26 merely being moved into different openings in the open wire mesh of the sides of the runway 14. This permits the male animal to be in proximity to the female animal, but prevents fights therebetween.

Figure 2:
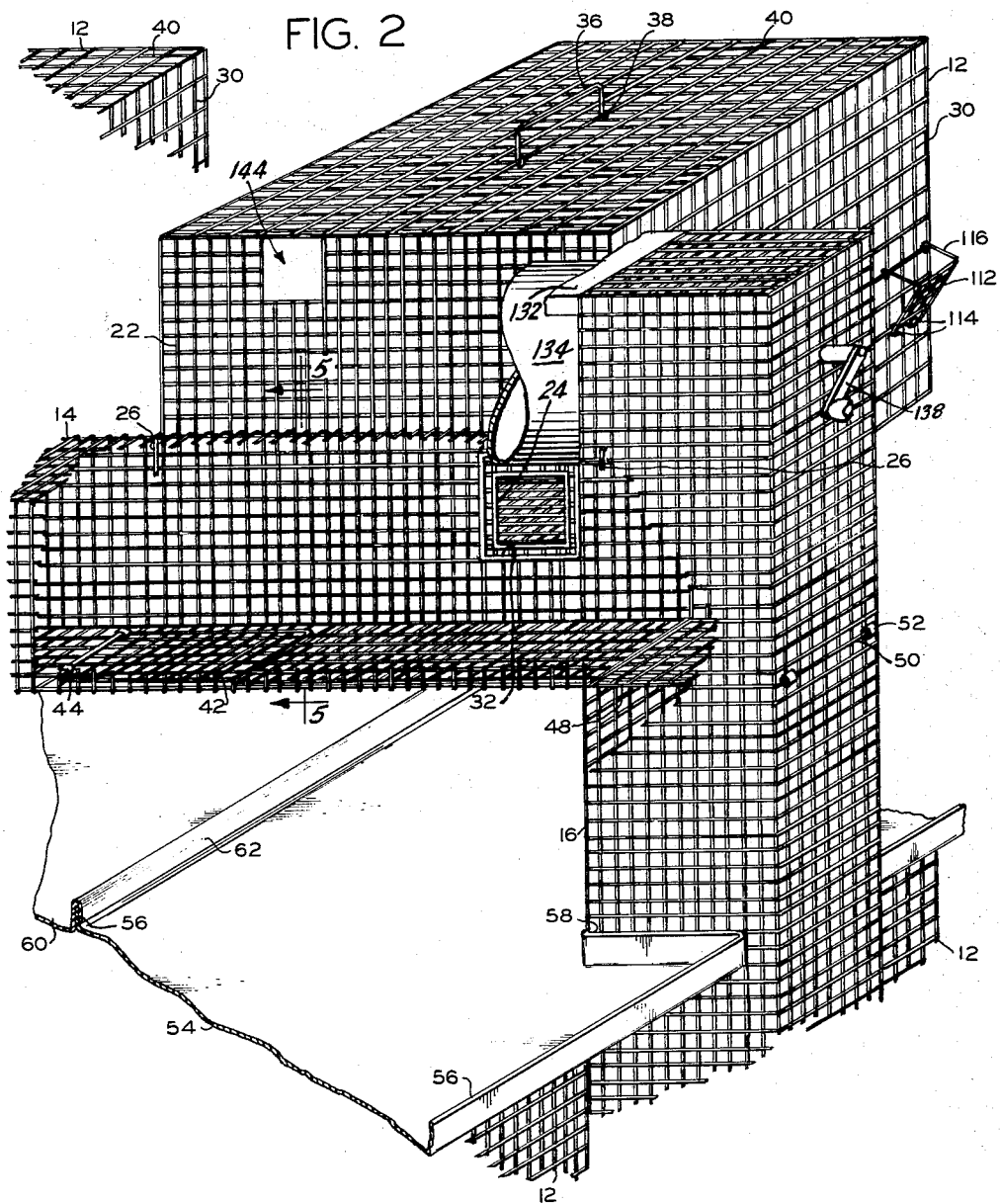
FIG. 2 is an enlarged, fragmentary perspective view of a portion of the cage construction of FIG. 1.

The runways 14 also are provided with wire mesh doors or gates 42 hinged at bottoms 44 thereof for pivotal movement between down or open positions, as shown in FIG. 2, and positions closing the runways 14, in which closed positions the upper edges of the gates 42 are wired or clipped to the tops of the runways 14. The runways 14 open at each end into the vertical runways 16 to permit the male animal to move from one runway 14 to another runway 14. To selectively close off a male animal in one runway 14 from another runway 14, the vertical runways 16 are provided with doors 48 hinged at edges 50 thereof to the vertical runways for movement between closed positions closing the vertical runway and open positions opening the vertical runway, clips like hinging clips 52 being supplied for holding the gates 48 in their closed positions. End droppings trays 54 are provided under the end ones of the cages and rest on all the end cages except the uppermost cages to catch droppings from the cages thereabove and also are provided on the platform 18 for the lowermost cages. The trays 54 preferably are made of a suitable plastic material and have sides 56 and notches 58 to provide clearance for the vertical runways 16. Center trays 60 having overhanging edge portions 62 overhanging sides 56 of the trays 54 are positioned between the end trays.

As shown in FIGS. 3 and 4, each cage 12 has a wire mesh front door 70 adapted to close a doorway 72 in marginal wall or flange 74 of the cage and hinged by rings 76 at one edge. The door has a wire spring 78 secured by rings or clips 80 to the wire mesh thereof and a ring or clip 82 fastening an angular arm 84 of the wire latch 78 to the door. The wire latch 78 has a resilient, generally U-shaped loop 86 and a hook or latch 88 adapted to hook over a wire 90 on the wall 74 to hold the door in closed position. The loop 86 permits the latch 88 to be moved inwardly and upwardly to free the latch from the wire 90 so that the door 70 may be opened for access to the interior of the cage.

Mounted on the front of the door by tabs 92 is a feeder 94 having a tapered sheet metal body 96 having upper tabs 98 formed into rings fixed to the door 70. The body 96 has a U-shaped groove 100 in which is mounted a wire mesh panel 102 covering the top and permitting food pellets to be dropped therethrough into a bin portion 104. An overhanging lip 106 is positioned in the bottom of opening 108 in the door 70 to prevent the animal from raking out the food positioned in the bin portion 104. A small mesh wire catch pan 110 is adapted to be hung from the bottom of the cage 12 or to be placed on one of trays 54 or 60 directly below the portion of the cage 12 adjacent the feeder 94 to catch pellets dropped by the animal. The catch pan 110 is readily accessible at the edge of the tray 54 or 60. A wire mesh panel 112 (FIG. 2) secured by rings 114 at the lower edge thereof to the side 30 of each cage 12 is movable between a position folded against the side 30 and an operative position shown in FIG. 2 limited by strands 116. The panel 112 holds hay on the wire mesh side 30 of the cage 12 for the animal in the cage to feed upon. If desired, a spring catch may be provided on the side 30 or the panel 112 to hold the panel in its folded position against the side 30 when the rack is not to be used.

The support 18 (FIGS. 1 and 6) comprises cross members 120 to which a heavy wire mesh panel 122 is fastened, the panel 122 having flanges 124 to stiffen it and form it into the shape of the channel extending between the cross members 120. The members 120 are supported by the casters 20. The runways 14 and 16 form a rigid frame with the support 18 for supporting the cages 12, and the runways 16 have bottom portions 128 clamped tightly against the cross member 120 by cleats 132 bolted to the cross members 120. Preferably the bottom portions 128 extend under the cleats 132 and are clamped by the cleats against the members 120.

A multi-compartment duster 130 (FIGS. 7 and 8) includes a cover 132 in a position covering the top of the space between the two laterally aligned cages 12 on opposite sides of each runway 14. A dusting cylinder 134 is positioned below the cover 132 in tangential contact therewith, and also in substantially tangential contact with the back walls 22 of the cages 12 at the top of the runway 14. Shaft portions 136 at the ends of the cylinder, which are closed, support the cylinder rotatably and have cranks 138 adapted to rotate the cylinder, the shafts 136 projecting through the mesh and journaled by the mesh of the runways 16.

As illustrated in FIGS. 7 and 8, the cylinder 134 has doorways 140 therein spaced therealong from doorways 142 alternating with the doorways 140. The doorways 140 also are spaced peripherally around the cylinder 134 in positions offset peripherally from the doorways 142. The doorways 140 are positioned in lateral alignment with the doorways 144 positioned in the cages 12 at the right-hand side of the dusting cylinder, as viewed in FIGS. 7 and 8, and the doorways 142 are located along the cylinder 134 so as to be positionable in communication with the doorways 146 positioned in the cages 12 to the left of the cylinder. The cylinder has partitions 150 dividing the cylinder into separate compartments, one compartment for each of the doorways 140 and one compartment for each of the doorways 142, and gussets 152 are provided between the cover 132 and the back walls 22 of the cages 12 substantially directly above each of the partitions 150 to prevent movement of the animals therepast. The cylinder 134 may be rotated selectively to any of three positions by either handle 138, and suitable, spring detent type latches (not shown) are provided to hold the cylinder 134 in any position to which it is rotated. In one of these positions, as shown in FIG. 7, the cylinder 134 has the doorways 142 open to the space to which the doorways 146 are open so that the animals in the cages 12 to the left of the runway 14 may go through the doorways 146 and 142 into the cylinder and dust themselves in rock dust 162 held by angular partition plates 164, screening covers 166 joining the plates 164 which have doorways 168 therein and serving to screen out droppings. When the cylinder 134 is in this position the openings 140 are positioned on the same side of the cylinder 134 as the openings 142 and are completely closed to the openings 144 in the cages 12 to the right of the runway 14 so that the animals in these latter cages cannot get into the cylinder 134. In the second of these positions the cylinder 134 is rotated clockwise, as viewed in FIG. 8, about 180° from the position of the cylinder shown in FIG. 7. This moves the openings 140 to the other side of the cylinder from that in which they are positioned in FIG. 7 to open the doorways 140 to the doorways 144 so that the animals in the cages 12 to the right of the runway 14, as viewed in FIG. 7, can enter their compartments in the dusting cylinder, plates 176 like the plates 164 and screening covers 178 like the screening covers 166, being provided in the compartments opening to the cages 12 to the right of the runway 14 for holding rock dust similar to the rock dust 162 in the bottoms of the compartments. In this position of the cylinder 134 the openings 142 are positioned at the lower righthand side of the cylinder and are completely inaccessible from the doorways 146. In the third position of the cylinder 134, which position is between the two positions just described, the doorways 140 are at the top and to the left of the centerline of the cylinder 134 so that they are inaccessible from the doorways 144 and the doorways 142 are to the right of the centerline of the cylinder and at the top of the cylinder so that the doorways 146 are not accessible thereto. Thus, the dusting cylinder in this position is closed to the animals from the cages 12 on both sides of the runway 14. Pumice stone rods 180 and 182 are provided in the compartments to brush the animals as they move in and out of the compartments and around the compartments, the rods being suitably fastened to the interior portions of the cylinder and the plates 164 and 176.

In FIGS. 9 and 10, there is shown a watering system of the animal cage construction 10 which includes a reservoir 200 having a float control valve 202 and supplied with water from a pipe 204 leading to a source of water under pressure. The reservoir 200 supplies the water at a low pressure, a few pounds of pressure being provided. An overflow pipe 206 leads from the reservoir to a suitable drain (not shown). A main pipe 208 extends downwardly from the reservoir 200, which is preferably supported by one of the vertical runways 16 and horizontal, lateral or header pipes 210 lead from the pipe 208 horizontally, preferably extending under the runways 14, as do lateral header drain pipes 212. Branch pipes 214 from the pipes 210 extend to positions under the cages 12 in which are positioned troughs 216 having openings 218 below protective roofs 220. Branch drain pipes 222 lead from the pipes 212 to positions under the cages 12. The troughs 216 have quick operable coupling portions 219 of the breech type and adapted to securely connect to connector portions of valves 221 on the ends of the pipes 214 and depress spring-pressed valve members of the valves 221 to open the valves when the connectors 219 are joined to the valves 221. Flexible pipes 226 lead from overflow pipes 224 to the pipes 222 to carry away overflow water from the troughs 216.

Each trough 217 has a valve housing 230 in communication with an opening 232 in the trough 217 leading to the connector 219 and receiving water under the low pressure from the reservoir 200 through the pipe 214. A flexible valve closure member 234 is positioned in the housing 230 and is connected to a rod 236 fixed to a ball float 238, and when the water rises to the desired level in the trough 217, the float 238 pulls the valve closure member 234 upwardly to a position closing upwardly facing outlet port 240 in the housing 230. When the water level drops the float 238 drops and pushes the valve closure member 234 down away from the opening 240 to permit water to flow into the tank to raise it to the desired level again.

The above described animal cage construction 10 is simple in construction, may be provided with as many cages as desired for each unit, there being eighteen cages shown in the unit described, however, any number less than eighteen may be provided on the particular animal cage construction 10 disclosed, and each cage may be individually positioned in communication with the runway on which it is hung, or may be hung on that runway in a position closing the door to that runway. The runways form a frame which supports the cages in easily accessible and serviceable positions, and in a compact overall unit. The duster 130 is selectively positionable to permit a second group of animals to separately dust themselves, or to permit neither to gain access thereto. The watering system is trouble-free, the level of the water being always visible from the openings 218 which face the fronts of their respective cages, and provides trouble-free operation with no overflow problems.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. In combination,
a combined frame and runway having an opening therein,
a cage having an opening therein,
and quick-releasable hook means for selectively holding the cage in a position in which the openings are aligned and a position in which the opening in the cage is closed by the runway and the opening in the runway is closed by the cage.
2. In combination,
runway means of open mesh wire having parallel horizontal portions spaced one above the other and at least one vertical portion connecting the horizontal portions and forming an open, wall-like vertical frame,
the horizontal portions of the runway means having openings in opposite sides thereof spaced therealong,
a plurality of cages each having a back wall having an opening,
and a plurality of hooks on the cages for detachably hanging the cages on the opposite sides of the runway means in vertically spaced, horizontal rows and alternately in positions in which the openings in the cages are aligned with the openings in the runway means and in positions in which the openings in the cages are closed by the runway means.
3. The combination of claim 2 including a plurality of drop pans adapted to rest on the tops of the lower cages in positions below the cages thereabove.
4. In combination,
a pair of cages mounted in spaced generally aligned positions and having facing walls provided with openings therein,
an arcuate door having a pair of openings therein and rotatable selectively between a first position in which one opening in the door is aligned with the opening in one of the cages and the door closes the opening in the other cage, a second position in which the other opening in the door is aligned with the opening in the other cage and the door closes the opening in said one of the cages and a third position in which the door closes both the openings in the cages,
and enclosure means forming with the door a confined area selectively accessible to the pair of cages.
5. In combination,
a first cage having a vertical first wall having a first dorway in the upper portion thereof,
a second cage having a vertical second wall having a second doorway in the upper portion thereof positioned with the second wall facing oppositely to and spaced from and parallel to the first wall with the second doorway at the same height as and offset horizontally from the first doorway, a cylinder rotatable on a horizontal axis in a position between the first and second walls and tangent thereto along lines below the doorways, a cover extending from one cage to the other cage and engaging the top portion of the cylinder, dusting material in the cylinder, the cylinder having a third doorway extending only partially therearound and therealong substantially coextensively with the first doorway, the cylinder also having a fourth doorway extending only partially therearound and therealong substantially coextensively with the second doorway, the fourth doorway being offset along the cylinder from the third doorway and also being offset around the cylinder from the third doorway, and partition means in the cylinder separating the third and fourth doorways, the cylinder being rotatable selectively to a first position in which the third doorway is on the side of the cylinder positioned away from the first doorway so that the interior of the cylinder is inaccessible from the first cage and the fourth doorway is on the side of the cylinder adjacent to the second doorway so that the interior of the cylinder is accessible from the second cage, a second position in which the third doorway is on the side of the cylinder adjacent the first doorway so that the interior of the cylinder is accessible from the first cage and the fourth doorway is on the side of the cylinder positioned away from the second cage so that the interior of the cylinder is inaccessible from the second cage and a third position in which the third and fourth doorways are on the sides of the cylinder respectively positioned away from the first and second doorways so that the interior of the cylinder is inaccessible from both cages.

6. In an animal cage construction, a plurality of horizontal runways mounted in parallel positions spaced one above the other, a plurality of cages mounted on opposite sides of the runways in vertically and horizontally spaced rows, means for selectively providing access from the cages to the runways, a plurality of rotatable dusters mounted between the rows of cages above and along the runways, closure means for the dusters and the cages, and means for selectively positioning the closure means of the dusters adjacent one or the other of the closure means of the cages.

7. In combination, a pair of spaced vertical runways, a plurality of vertically spaced, horizontal runways extending between and supported by the vertical runways in communication therewith, selectively operable gate means in the runways, and a plurality of cages having hooks for engaging the sides of the horizontal runways to support the cages at the sides of the horizontal runways, the adjacent portions of the runways and the cages having doorway means which are individually opened and closed by selective positioning of the cages on the runways.

8. In combination, a plurality of horizontal runways having openings at spaced points therealong, a plurality of parallel, vertical tower means connected to and supporting the runways to form therewith a vertical frame, a plurality of cages having openings thereon, and connector means for suspending the cages from the runways in positions between the towers in which walls of the cages abut the runways and the openings in the cages are aligned with and communicate with the openings in the runways.

References Cited by the Examiner
UNITED STATES PATENTS

| | | | |
|---|---|---|---|
| 1,462,107 | 7/1923 | Holman | 119—20 |
| 2,515,063 | 6/1950 | Stanchfield | 119—50 X |
| 2,713,323 | 7/1955 | Marsh | 119—21 |
| 2,725,036 | 11/1955 | Petrie | 119—17 |
| 2,752,722 | 7/1956 | Gardner | 43—61 |
| 3,018,760 | 1/1962 | Tate | 119—17 X |
| 3,062,183 | 11/1962 | Tate | 119—15 |
| 3,114,350 | 12/1963 | King et al. | 119—18 X |
| 3,124,101 | 3/1964 | Wierenga | 119—22 |
| 3,159,139 | 12/1964 | Haggard et al. | 119—17 |

SAMUEL KOREN, *Primary Examiner.*

ALDRICH F. MEDBERY, *Examiner.*